(12) United States Patent
Chaturvedi et al.

(10) Patent No.: US 8,405,351 B2
(45) Date of Patent: Mar. 26, 2013

(54) SYSTEM AND METHOD FOR CHARGING AND DISCHARGING A LI-ION BATTERY

(75) Inventors: Nalin Chaturvedi, Sunnyvale, CA (US); John F. Christensen, Mountain View, CA (US); Jasim Ahmed, Mountain View, CA (US); Boris Kozinsky, Newton, MA (US)

(73) Assignee: Robert Bosch GmbH, Stuttgart (DE)

( * ) Notice: Subject to any disclaimer, the term of this patent is extended or adjusted under 35 U.S.C. 154(b) by 534 days.

(21) Appl. No.: 12/463,024

(22) Filed: May 8, 2009

(65) Prior Publication Data

US 2010/0285339 A1    Nov. 11, 2010

(51) Int. Cl.
*H02J 7/00*    (2006.01)

(52) U.S. Cl. ........ 320/122; 320/118; 320/119; 320/121; 320/132; 320/137

(58) Field of Classification Search .................. 320/118, 320/122
See application file for complete search history.

(56) References Cited

U.S. PATENT DOCUMENTS

| | | | |
|---|---|---|---|
| 5,640,078 A | 6/1997 | Kou et al. | |
| 5,955,867 A | 9/1999 | Cummings et al. | |
| 6,046,575 A | 4/2000 | Demuro | |
| 6,072,299 A * | 6/2000 | Kurle et al. | 320/112 |
| 6,198,253 B1 * | 3/2001 | Kurle et al. | 320/132 |
| 6,288,521 B1 * | 9/2001 | Meador | 320/118 |
| 6,773,616 B1 | 8/2004 | Chen et al. | |
| 7,029,796 B2 | 4/2006 | Choi et al. | |
| 7,071,653 B2 * | 7/2006 | Suzuki et al. | 320/128 |
| 7,193,394 B2 * | 3/2007 | Ueda et al. | 320/128 |
| 7,728,555 B2 * | 6/2010 | Seo et al. | 320/132 |
| 2001/0005124 A1 | 6/2001 | Odeohhara et al. | |
| 2004/0214091 A1 | 10/2004 | Lim et al. | |
| 2004/0242804 A1 | 12/2004 | Medsker et al. | |
| 2006/0154141 A1 | 7/2006 | Salot et al. | |
| 2006/0216603 A1 | 9/2006 | Choi | |
| 2007/0042267 A1 | 2/2007 | Kim et al. | |
| 2007/0202400 A1 | 8/2007 | Yoshida et al. | |
| 2008/0044732 A1 | 2/2008 | Salot et al. | |
| 2008/0058194 A1 | 3/2008 | Grader et al. | |

FOREIGN PATENT DOCUMENTS

| | | |
|---|---|---|
| EP | 1837734 A2 | 9/2007 |
| GB | 2346274 A | 8/2000 |

OTHER PUBLICATIONS

Christensen, J. and J. Newman, Effect of anode film resistance on the charge/discharge capacity of a lithium-ion battery. Journal of the Electrochemical Society, 2003. 150(11): p. A1416-A1420.
Christensen, J. and J. Newman, Cyclable Lithium and Capacity Loss in Li-Ion Cells. Journal of the Electrochemical Society, 2005. 152(4): p. A818-A829.

(Continued)

*Primary Examiner* — Edward Tso
*Assistant Examiner* — Ahmed Omar
(74) *Attorney, Agent, or Firm* — Maginot, Moore & Beck

(57) ABSTRACT

An electrochemical battery system in one embodiment includes a first electrochemical cell, a second electrochemical cell, a memory in which command instructions are stored, and a processor configured to execute the command instructions to (i) selectively charge or discharge the first electrochemical cell based upon an evaluation of first criteria associated with the first electrochemical cell, and (ii) selectively charge or discharge the second electrochemical cell based upon an evaluation of second criteria associated with the first electrochemical cell.

16 Claims, 4 Drawing Sheets

OTHER PUBLICATIONS

Amatucci, G.G. and N. Pereira, Flouride based electrode materials for advanced energy storage devices. Journal of Flourine Chemistry, 2007. 128(4):p. 243-262.

Mikhaylik, Y. Fundamental Chemistry of Sion Power Li/S Battery, in International Battery Association and Hawaii Battery Conference. 2006. Waikoloa, HI.

Wang, J., L. Liu, Z. Ling, J. Yang, C. Wan, and C. Jiang, Polymer lithium cells with sulfur composites as cathode materials. Electrochimica Acta, 2003. 48(13): p. 1861-1867.

Shim, J., K.A. Striebel, and E.J. Cairns, the Lithium/Sulfur Rechargeable Cell. Journal of the Electrochemical Society, 2002. 149: p. A1321.

Doughty, D.H., D.L Coleman, and M.J. Berry. Abuse Tolerance Studies on Lithium-Sulfur (Li-S) Rechargeable Batteries. in 43 Power Sources Conference. 2008, Philadelphia, PA.

Schrock, R.R., Catalytic Reduction of Dinitrogen to Ammonia at a Single Molybdenum Center. Accounts of Chemical Research, 2005. 38(12): p. 955-962.

International Search Report in corresponding PCT application (i.e., PCT/US2010/033970) mailed Mar. 21, 2011 (4 pages).

\* cited by examiner

SYSTEM AND METHOD FOR CHARGING AND DISCHARGING A LI-ION BATTERY

Cross-reference is made to U.S. Utility patent application Ser. No. 12/437,576 entitled "Li-ion Battery with Selective Moderating Material" by John F. Christensen et al., which was filed on May 8, 2009; U.S. Utility patent application Ser. No. 12/437,592 entitled "Li-ion Battery with Blended Electrode" by John F. Christensen et al., which was filed on May 8, 2009; U.S. Utility patent application Ser. No. 12/437,606 entitled "Li-ion Battery with Variable Volume Reservoir" by John F. Christensen et al., which was filed on May 8, 2009; U.S. Utility patent application Ser. No. 12/437,622 entitled "Li-ion Battery with Over-charge/Over-discharge Failsafe" by John F. Christensen et al., which was filed on May 8, 2009; U.S. Utility patent application Ser. No. 12/437,643 entitled "System and Method for Pressure Determination in a Li-ion Battery" by John F. Christensen et al., which was filed on May 8, 2009; U.S. Utility patent application Ser. No. 12/437,745 entitled "Li-ion Battery with Load Leveler" by John F. Christensen et al., which was filed on May 8, 2009; U.S. Utility patent application Ser. No. 12/437,774 entitled "Li-ion Battery with Anode Coating" by Boris Kozinsky et al., which was filed on May 8, 2009; U.S. Utility patent application Ser. No. 12/437,791 entitled "Li-ion Battery with Anode Expansion Area" by Boris Kozinsky et al., which was filed on May 8, 2009; U.S. Utility patent application Ser. No. 12/437,822 entitled "Li-ion Battery with Porous Silicon Anode" by Boris Kozinsky et al., which was filed on May 8, 2009; U.S. Utility patent application Ser. No. 12/437,873 entitled "Li-ion Battery with Rigid Anode Framework" by Boris Kozinsky et al., which was filed on May 8, 2009; and U.S. Utility patent application Ser. No. 12/463,092 entitled "System and Method for Charging and Discharging a Li-ion Battery Pack" by Nalin Chaturvedi et al., which was filed on May 8, 2009, the entirety of each of which is incorporated herein by reference. The principles of the present invention may be combined with features disclosed in those patent applications.

FIELD OF THE INVENTION

This invention relates to batteries and more particularly to lithium-ion batteries.

BACKGROUND

Batteries are a useful source of stored energy that can be incorporated into a number of systems. Rechargeable lithium-ion batteries are attractive energy storage systems for portable electronics and electric and hybrid-electric vehicles because of their high specific energy compared to other electrochemical energy storage devices. In particular, batteries with a form of lithium metal incorporated into the negative electrode afford exceptionally high specific energy (in Wh/kg) and energy density (in Wh/L) compared to batteries with conventional carbonaceous negative electrodes.

When high-specific-capacity negative electrodes such as lithium are used in a battery, the maximum benefit of the capacity increase over conventional systems is realized when a high-capacity positive electrode active material is also used. Conventional lithium-intercalating oxides (e.g., $LiCoO_2$, $LiNi_{0.8}Co_{0.15}Al_{0.5}O_2$, $Li_{1.1}Ni_{0.3}Co_{0.3}Mn_{0.3}O_2$) are typically limited to a theoretical capacity of ~280 mAh/g (based on the mass of the lithiated oxide) and a practical capacity of 180 to 250 mAh/g. In comparison, the specific capacity of lithium metal is about 3863 mAh/g. The highest theoretical capacity achievable for a lithium-ion positive electrode is 1168 mAh/g (based on the mass of the lithiated material), which is shared by $Li_2S$ and $Li_2O_2$. Other high-capacity materials including $BiF_3$ (303 mAh/g, lithiated) and $FeF_3$ (712 mAh/g, lithiated) are identified in Amatucci, G. G. and N. Pereira, *Fluoride based electrode materials for advanced energy storage devices*. Journal of Fluorine Chemistry, 2007. 128(4): p. 243-262. All of the foregoing materials, however, react with lithium at a lower voltage compared to conventional oxide positive electrodes, hence limiting the theoretical specific energy. The theoretical specific energies of the foregoing materials, however, are very high (>800 Wh/kg, compared to a maximum of ~500 Wh/kg for a cell with lithium negative and conventional oxide positive electrodes).

Lithium/sulfur (Li/S) batteries are particularly attractive because of the balance between high specific energy (i.e., >350 Wh/kg has been demonstrated), rate capability, and cycle life (>50 cycles). Only lithium/air batteries have a higher theoretical specific energy. Lithium/air batteries, however, have very limited rechargeability and are still considered primary batteries.

Thus the advantage of using a Li metal anode is the much higher energy density of the entire cell, as compared to cells with graphitic or other intercalation anodes. A disadvantage of using pure Li metal is that lithium is highly reactive. Accordingly, the lithium metal can be damaged by other chemical species in the cell. Additionally, the lithium metal has a propensity to grow metallic dendrites when the cell is being charged. Metallic dendrites can then puncture the separator and cause an internal short of the cell.

Moreover, repeated cycling of a Li-anode cell results in significant morphology changes. The initially dense metal, after a certain number of cycles, develops surface roughness and a sponge-like morphology. This morphology is potentially dangerous due to high surface area which increases the chance for, and severity of, runaway reactions.

What is needed therefore is a battery system and method that reduces the potential for dendrite formation and undesired morphological changes in the anode. A system and method which could also be used to provide more accurate state of charge determination in a cell would be beneficial.

SUMMARY

An electrochemical battery system in one embodiment includes a first electrochemical cell, a second electrochemical cell, a memory in which command instructions are stored, and a processor configured to execute the command instructions to (i) selectively charge or discharge the first electrochemical cell based upon an evaluation of first criteria associated with the first electrochemical cell, and (ii) selectively charge or discharge the second electrochemical cell based upon an evaluation of second criteria associated with the first electrochemical cell.

In accordance with another embodiment, an electrochemical battery system, includes a plurality of electrochemical cells, a memory in which command instructions are stored, and a processor configured to execute the command instructions to (i) evaluate each of the plurality of electrochemical cells, and (ii) selectively connect a first of the plurality of electrochemical cells to a circuit based upon the evaluation while selectively isolating a second of the plurality of electrochemical cells from the circuit based upon the evaluation.

DESCRIPTION

Figure 1:
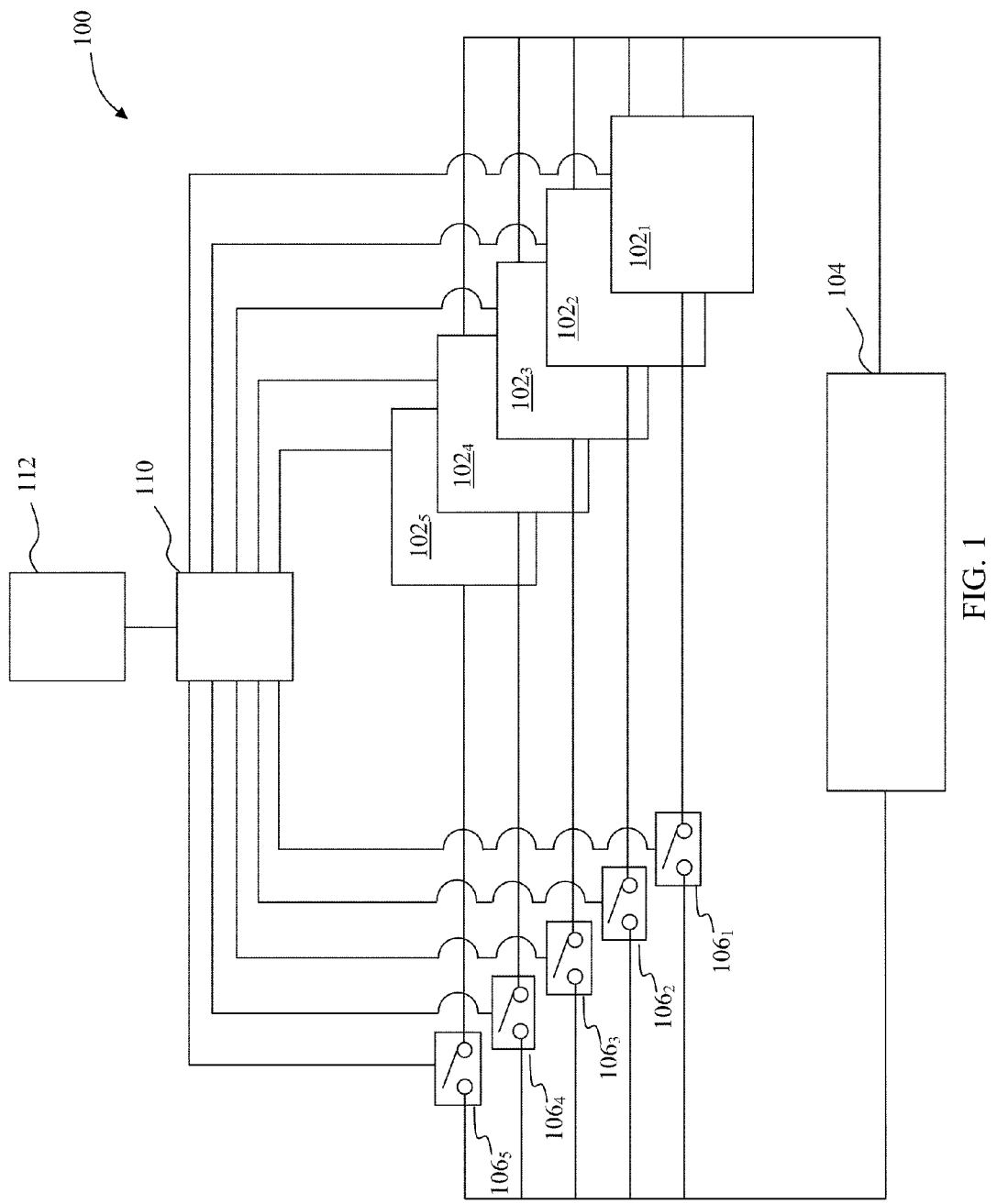
FIG. 1 depicts a simplified schematic of a battery system including several electrochemical cell packs which can be independently controlled for charging or discharging operations.

For the purposes of promoting an understanding of the principles of the invention, reference will now be made to the embodiments illustrated in the drawings and described in the following written specification. It is understood that no limitation to the scope of the invention is thereby intended. It is further understood that the present invention includes any alterations and modifications to the illustrated embodiments and includes further applications of the principles of the invention as would normally occur to one skilled in the art to which this invention pertains.

FIG. 1 depicts a battery system 100 including several lithium-ion battery cell packs $102_x$. In the embodiment of FIG. 1, five battery cell packs $102_{1-5}$ are depicted. In alternative embodiments, more or fewer battery cell packs of different or the same chemistry may be provided. Each of the lithium-ion battery cell packs $102_x$ is selectively connected to a load or voltage source 104 through a respective switch $106_x$. Each of the switches $106_x$ are controlled by a processor 110 which is operably connected to a memory 112. Various command instructions, discussed in further detail below, are programmed into the memory 112. The processor 110 is operable to execute the command instructions programmed into the memory 112.

Figure 2:
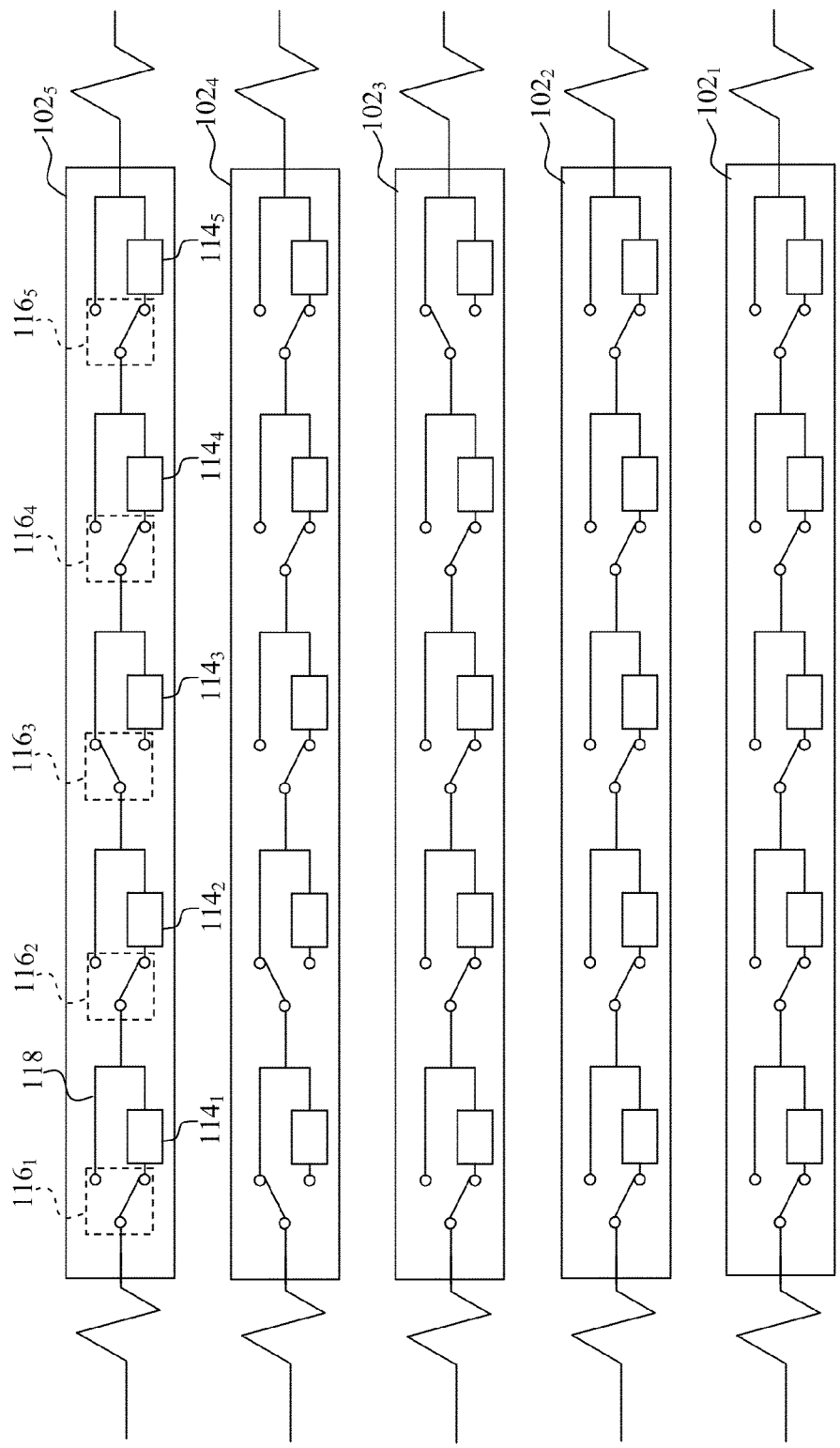
FIG. 2 depicts a simplified schematic of the cell packs of FIG. 1 showing the independently controlled connection switches for each of the electrochemical cells within the electrochemical cell packs.

The lithium-ion battery cell packs $102_x$ in this embodiment are identical and are described in further detail with reference to FIG. 2 and the lithium-ion battery cell pack $102_5$. The lithium-ion battery cell pack $102_5$ includes five lithium-ion battery cells $114_{1-5}$. A two-way connection switch $116_{1-5}$ is associated with each of the battery cells $114_{1-5}$. The connection switches $116_{1-5}$, which are independently controlled by the processor 110 (control lines are omitted for clarity), can alternatively connect the respective battery cells $114_{1-5}$ to an internal battery cell circuit 118 or bypass the respective battery cell $114_{1-5}$. In FIG. 2, the connection switches $116_{1, 2, 4, and\ 5}$ are positioned to connect the respective battery cells $114_{1, 2, 4, and\ 5}$ to the battery cell circuit 118 while the connection switch $116_3$ is positioned to a bypass position whereby the respective battery cell $114_3$ is effectively electrically isolated from the battery cell circuit 118.

The lithium-ion battery cells $114_{1-5}$ in this embodiment are identical and are described in further detail with reference to the lithium-ion battery cell $114_1$ shown in FIG. 3. The lithium ion cell $114_1$ includes a negative electrode 120, a positive electrode 122, and a separator region 124 between the negative electrode 120 and the positive electrode 122. The negative electrode 120 includes active materials 126 into which lithium can be inserted, inert materials 128, electrolyte 130 and a current collector 132.

The negative electrode 120 may be provided in various alternative forms. The negative electrode 120 may incorporate dense Li metal or a conventional porous composite electrode (e.g., graphite particles mixed with binder). Incorporation of Li metal is desired since the Li metal affords a higher specific energy than graphite.

The separator region 124 includes an electrolyte with a lithium cation and serves as a physical and electrical barrier between the negative electrode 120 and the positive electrode 122 so that the electrodes are not electronically connected within the battery cell $114_1$ while allowing transfer of lithium ions between the negative electrode 120 and the positive electrode 122.

The positive electrode 122 includes active material 136 into which lithium can be inserted, inert material 138, the electrolyte 130, and a current collector 140. The active material 136 includes a form of sulfur and may be entirely sulfur. A voltage meter 142 is configured to obtain the voltage between the anode 120 and the cathode 122, and a coulomb counter 144 is provided to detect current flow into and out of the battery cell $114_1$. The coulomb counter 144, which may be located anywhere along the circuit 118 or adjacent to the cell pack $102_1$, may be used to detect current flow into and out of all of the battery cells $114_{1-5}$ in the cell pack $102_1$ since the same current will be flowing through each of the battery cells $114_{1-5}$ connected to the circuit 118.

The lithium-ion battery cells $114_x$ operate in a manner similar to the lithium-ion battery cell disclosed in U.S. patent application Ser. No. 11/477,404, filed on Jun. 28, 2006, the contents of which are herein incorporated in their entirety by reference. In general, with reference to battery cell $114_1$, electrons are generated at the negative electrode 120 during discharging and an equal amount of electrons are consumed at the positive electrode 122 as lithium and electrons move in the direction of the arrow 146 of FIG. 2.

In the ideal discharging of the cell $114_1$, the electrons are generated at the negative electrode 120 because there is extraction via oxidation of lithium ions from the active material 126 of the negative electrode 120, and the electrons are consumed at the positive electrode 122 because there is reduction of lithium ions into the active material 136 of the positive electrode 122. During discharging, the reactions are reversed, with lithium and electrons moving in the direction of the arrow 148.

Returning to FIG. 1, the electrochemical battery cell packs $102_{1-5}$ may be used to selectively power the load/source 104 during normal discharge operations by selectively controlling the switches $106_{1-5}$ shut. Similarly, the electrochemical battery cell packs $102_{1-5}$ may be selectively recharged by the load/source 104 during normal charging operations by selectively controlling the switches $106_{1-5}$ and the cathode switches $108_{1-5}$ shut. Charging and discharging of the lithium-ion battery cells $114_x$ within the cell packs $102_x$ connected to the load 104 can further be selectively controlled by selectively controlling the associated connection switch $116_x$.

In practice, users frequently charge electrochemical cells prior to fully discharging the cells. Such practice, while convenient to the user or necessitated by operational considerations, increases the potential for dendrite formation and for non-uniform morphology changes in the anode. Moreover, as the capacity of a particular cell fades or otherwise decreases over the life of the cell, the relationship between the state of charge of the cell and the open cell potential (OCP) of the cell changes. The OCP of a cell is commonly incorporated into SOC determinations. Thus, as a cell ages, SOC determination for the cell becomes less accurate. The failure to fully discharge all of the cells also exacerbates degradation of the cells with greater capacity, as those cells are more aggressively used than the cells with lower capacity when the battery voltage is higher.

Figure 4:
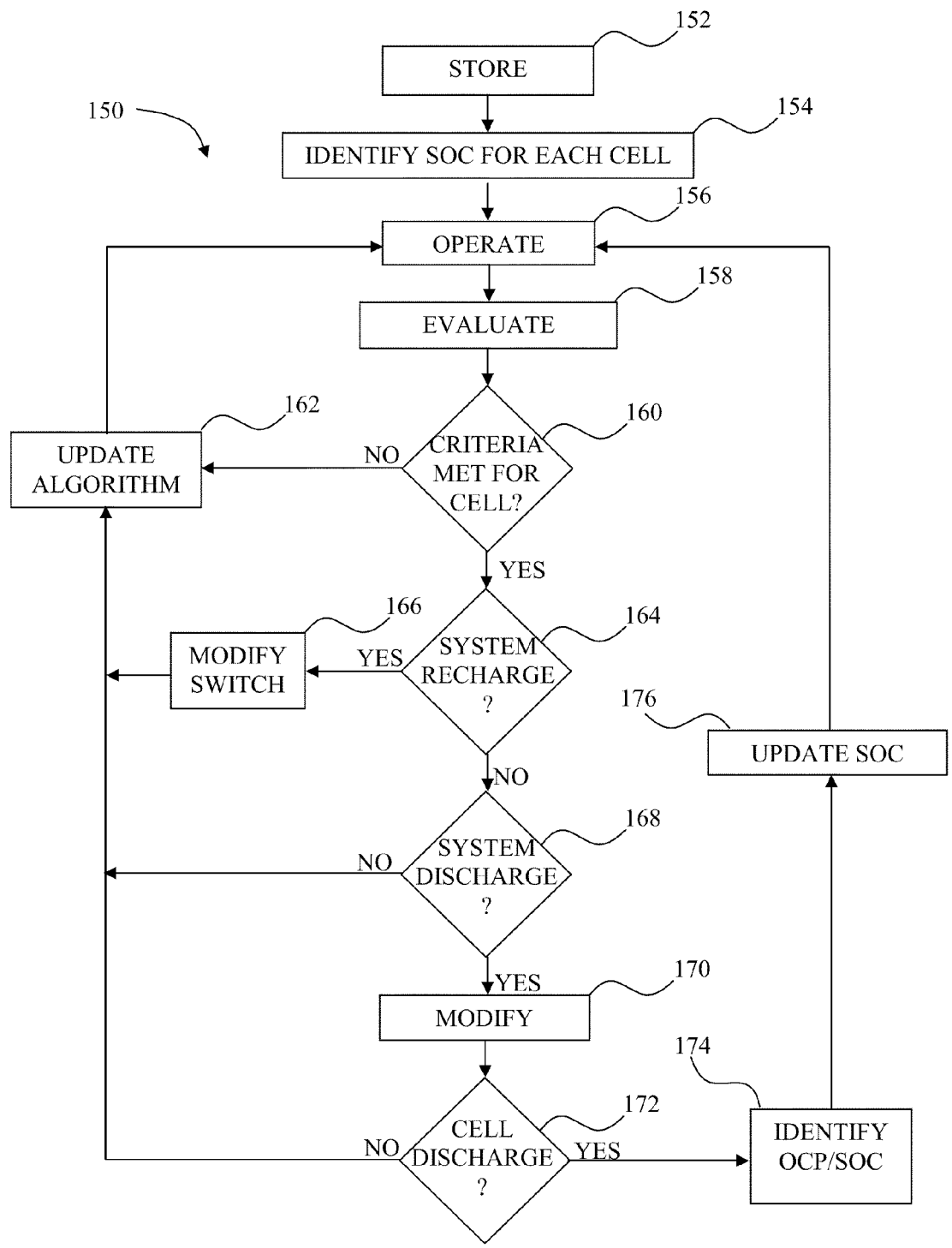
FIG. 4 depicts a flow diagram of a procedure that may be performed by the battery system of FIG. 1 to independently control charging and discharging operations of individual electrochemical cells.

Accordingly, in one embodiment, the processor 110 executes command instructions stored within the memory 112 in accordance with a procedure 150 of FIG. 4 to selectively charge and discharge the electrochemical cells $114_x$. Initially, criteria for operating the system 100 are stored in the memory 112 at block 152. The criteria may be in the form of an algorithm with different weights provided for different factors. By way of example, the time since a cell was last fully discharged may be given a first weight and the last known cell capacity may be given another weight. Thus, while two cells may have last been fully discharged at the same time, the cell with a lower capacity may receive a higher score using the stored algorithm. Since a "fully discharged" cell typically has some capacity remaining, the definition of "fully discharged" may vary from one system to another depending upon the cell chemistry, the application, and other criteria.

At block 154, the initial OCP/SOC relationship for each individual cell is stored in the memory 112. This information may be obtained in any desired manner. The system 100 is then operated with the processor 110 controlling the position of the switches $106_{1-5}$ and the connection switches $116_x$ at block 156.

As the system 100 is operated, the processor 110 receives data from the voltage meters 142 and the coulomb counters 144 associated with each of the cells $114_x$. These data are used by the processor 110 to identify a present SOC for each of the cells $114_x$. The identified SOC and other data available to the processor 110 are used at the block 158 to evaluate the present condition of each of the cells using the criteria stored at block 152. If, based upon the evaluation, the criteria is not met for selective control of one or more of the cells $114_x$ at block 160, then the algorithm is updated at block 162 and the processor 110 continues to operate the system 100. Updates to the algorithm may include, for example, modifying the weight given to the time since the cell was last fully discharged. Thus, the weight associated with a particular factor evaluated by the processor 110 need not exhibit a linear characteristic as the cells age.

If at block 160 the criteria for selective control of a cell $114_x$ are met, the processor 110 ascertains the status of the system 100. At block 164, the processor 110 determines if the system 100 is being recharged. If the system 100 is being recharged, then at block 166 the processor 110 executes command instructions stored in the memory 112 to selectively control the switches $106_{1-5}$ and the connection switches $116_x$.

By way of example, the criteria stored in the memory 152 may include different thresholds which are used to prioritize actions. In one embodiment, a cell $114_x$ which has a SOC less than a predetermined threshold, which may be between 40 and 60% SOC, is preferably fully discharged prior to recharging, cells which are fully discharged are prioritized for charging, and cells greater than the predetermined threshold may be charged. The actual thresholds used for a particular embodiment may be differently selected based upon considerations such as chemistries involved, and the particular application.

In one example, the threshold is selected to be 40% SOC, the cell $114_1$ is at 30% SOC, the cell $114_2$ is at 20% SOC, the cell $114_3$ is fully discharged, the cell $114_4$ is at 80% SOC, and the cell $114_5$ is at 45% SOC. Accordingly, at block 166 when the load 104 is charging the cell packs $102_{1-5}$, the processor 110 controls the switch $106_5$ to the shut position and the connection switch $116_3$ to connect the cell $114_3$ to the circuit 118. Thus, the cell $114_3$ receives a charging current.

The processor 110 may further evaluate the available charging current to optimize the rate of charge for the cells $114_x$ and other charging criteria to selectively charge cell $114_x$ in the battery packs $102_{1-4}$. The processor 110 further controls the connection switch $116_{1, 2, 4, and 5}$ to the bypass position so that the cells $114_{1, 2, 4, and 5}$ are not charged. Thus, the cell $114_3$ is charged prior to the other cells $114_x$ in the battery pack $102_5$.

Once the cell $114_3$ and other fully discharged cells are fully charged, the processor 110 controls the connection switch $116_3$ to the open position and, if charging current is still available, controls the connection switch $116_4$ to the closed position. Thus, the cell $114_4$, which is farthest from the 40% SOC threshold, is preferably charged before charging the cell $114_1$, the cell $114_2$, or the cell $114_5$. The next cell to be charged would thus be the cell $114_5$. Once the cell $114_5$ is charged, the processor 110 may either terminate charging, or charge the cells $114_{1 and 2}$, depending upon the criteria stored in the memory 112. In alternative embodiments, the processor 110 may execute command instructions which do not allow a cell to be recharged until the cell has been discharged below another predetermined SOC threshold.

After the charging operation is completed for a particular cell $114_x$, the algorithm is updated at block 162 and the processor 110 continues to control operation of the system 100 at block 156. The update may include data associated with the time of the last full discharge as well as SOC data. The SOC data may include the capacity of the particular cell $114_x$ with respect to voltage of the cell including a reset of the 0% SOC threshold for the cell $114_x$.

If at block 164, the processor 110 determines that the system 100 is not being recharged, the processor 110 then determines if the system is discharging at block 168. If the system is not being discharged at block 168, the algorithm is updated at block 162 and the processor 110 awaits further operation of the system 100 at block 156. If the system 100 is being discharged, then at block 170 the processor 110 executes command instructions stored in the memory 112 to selectively control the switches $106_{1-5}$ and the connection switches $116_x$. By way of example, with the SOC conditions identified in the example above, discharge of the cell $114_5$ may be prioritized.

When discharging is terminated for a particular cell $114_x$, the processor 110 identifies if the cell $114_x$ has been fully discharged. If the cell has not been fully discharged, then the algorithm is updated at block 162 and the processor 110 continues to operate the system 100 at block 156. If the cell has been fully discharged at block 172, then the procedure 150 continues to block 174.

Figure 3:
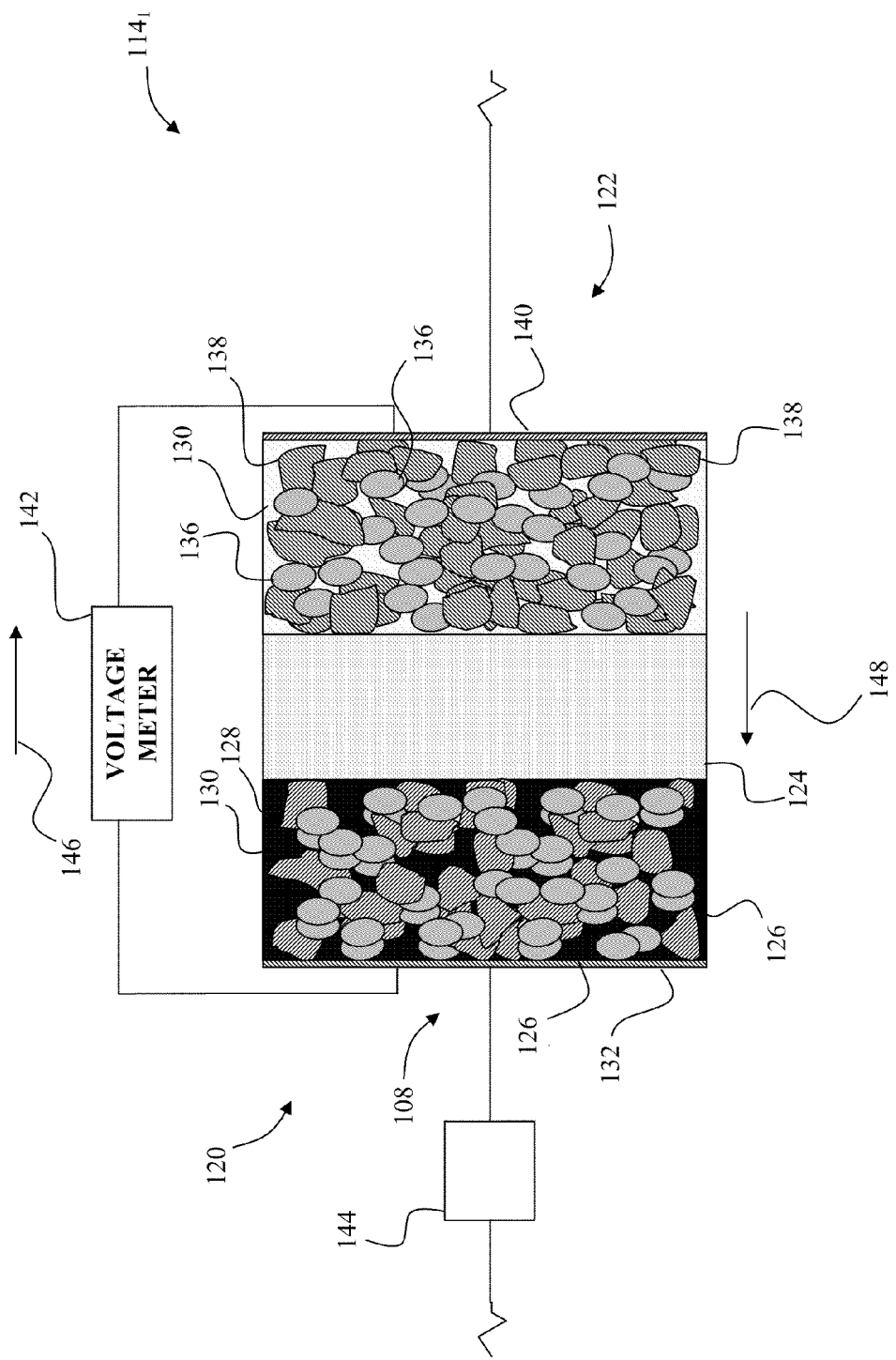
FIG. 3 depicts a schematic of one of the electrochemical cells of FIG. 1 showing amp meters and a voltage meter which can be used in executing a charging and discharging strategy.

One advantage of the procedure of FIG. 3 is that by completely discharging a particular cell, the roughness in Li-anode can be reduced and hence the anode morphology is improved. Another important advantage occurs in improved accuracy for SOC estimation. Specifically, in addition to integration of current data, SOC estimators also rely on voltage measurement to improve SOC determination accuracy. By discharging a cell completely, the SOC estimate of the cell is reset to a value that is close to zero. By further incorporating measurement of the cell voltage and current obtained during full discharge and subsequent charging of the cell, the fully charged SOC may be accurately identified based upon the charged capacity and the theoretical capacity of the cell. Furthermore, the OCP/SOC relationship of the aged cell may be ascertained using the obtained data at block 174. Thus, updated SOC data may be stored in the memory 112 at block 176 and the processor 110 continues to operate the system 100 at block 156.

The procedure 150 may be modified to incorporate other criteria or factors in the control algorithm. By way of example, maintaining a certain number of fully charged cells may be given an increased weighting. The procedure 150 may further be modified to sequentially fully discharge at least one cell. Thus, the cell $114_2$ may initially be preferentially discharged, with other cells connected to a load as needed. Once full discharge of the cell $114_2$ is accomplished, the cell $114_1$ may be preferentially discharged. The sequence may be specifically identified or randomly generated. In a further embodiment, the sequence is dependent upon a number of different criteria including time since last full discharge, cell capacity, etc.

Thus, the procedure 150, even if modified for a particular application, increases the likelihood that smooth anode coatings will be formed, thereby reducing the potential of harmful dendrite formation and undesired surface morphology.

While the invention has been illustrated and described in detail in the drawings and foregoing description, the same should be considered as illustrative and not restrictive in character. It is understood that only the preferred embodiments have been presented and that all changes, modifications and further applications that come within the spirit of the invention are desired to be protected.

The invention claimed is:

1. An electrochemical battery system, comprising:
   a first electrochemical cell;
   a second electrochemical cell;
   a memory in which command instructions are stored; and
   a processor configured to execute the command instructions to (i) selectively charge or discharge the first electrochemical cell based upon an evaluation of first criteria associated with the first electrochemical cell, and (ii) selectively charge or discharge the second electrochemical cell based upon an evaluation of second criteria associated with the second electrochemical cell, wherein the command instructions define a state of charge (SOC) threshold, and the processor is configured to execute the command instructions to selectively charge the first electrochemical cell whenever the SOC of the first electrochemical cell is above the SOC threshold and charging is available, and to selectively discharge the first electrochemical cell when the SOC of the first electrochemical cell is below the SOC threshold.

2. The electrochemical battery system of claim 1, wherein the processor is configured to execute the command instructions to preferentially charge the first electrochemical cell over the second electrochemical cell based upon the evaluation of the first criteria and the evaluation of the second criteria.

3. The electrochemical battery system of claim 2, wherein the processor is configured to execute the command instructions to preferentially discharge the second electrochemical cell over the first electrochemical cell based upon the evaluation of the first criteria and the evaluation of the second criteria.

4. The electrochemical battery system of claim 3, wherein the second criteria comprises the time since the second electrochemical cell has been discharged to a predetermined state of charge (SOC).

5. The electrochemical battery system of claim 4, wherein the processor is configured to execute the command instructions to determine a capacity of the second electrochemical cell based upon a discharge operation wherein the SOC of the second electrochemical cell is reduced to the predetermined SOC.

6. The electrochemical battery system of claim 1, further comprising:
   a first connection switch operatively connected to the first electrochemical cell for selectively connecting or disconnecting the first electrochemical cell to a cell pack circuit; and
   a second connection switch operatively connected to the second electrochemical cell for selectively connecting or disconnecting the second electrochemical cell to the cell pack circuit, wherein the processor is operatively connected to each of the first connection switch, and the second connection switch, to selectively open and close the first connection switch, and the second connection switch.

7. An electrochemical battery system, comprising:
   a plurality of electrochemical cells;
   a memory in which command instructions are stored; and
   a processor configured to execute the command instructions to (i) evaluate each of the plurality of electrochemical cells, and (ii) selectively connect a first of the plurality of electrochemical cells having a first state of charge (SOC) greater than a first SOC threshold to a circuit when the circuit is configured to provide a charge to the electrochemical battery system based upon the evaluation while selectively isolating a second of the plurality of electrochemical cells having a second SOC greater than the first SOC threshold from the circuit when the circuit is configured to provide a charge to the electrochemical battery system based upon the evaluation, wherein the first SOC is greater than the second SOC.

8. The electrochemical battery system of claim 7, wherein the evaluation comprises identifying for each of the plurality of electrochemical cells a respective state of charge (SOC).

9. The electrochemical battery system of claim 8, wherein the processor is further configured to execute the command instructions to:
   identify one of the plurality of cells that has been discharged to a predetermined threshold;
   selectively connect the one of the plurality of electrochemical cells to the circuit;
   identify an amount of current passed into the one of the plurality of cells; and
   identify a maximum SOC for the one of the plurality of cells based upon the amount of current passed into the one of the plurality of cells.

10. The electrochemical battery system of claim 8, wherein the processor is further configured to execute the command instructions to:
    identify each of the plurality of electrochemical cells with a SOC below the first SOC threshold and above a second SOC threshold; and
    preferentially connect each of the identified plurality of electrochemical cells with a SOC below the first SOC threshold and above a second SOC threshold to the circuit when the circuit is receiving power from the electrochemical battery system.

11. An electrochemical battery system, comprising:
    a first electrochemical cell;
    a second electrochemical cell;
    a memory in which command instructions are stored; and
    a processor configured to execute the command instructions to selectively charge or discharge the first electrochemical cell based upon an algorithm of weighted factors, wherein
    the weighted factors include a first time since the first electrochemical cell has been discharged to a state of charge (SOC) threshold, the weighted factors include a second time since the second electrochemical cell has been discharged to the SOC threshold, and the first time is not the same as the second time.

12. The electrochemical battery system of claim 11, wherein the weighted factors include a SOC of the first electrochemical cell.

13. The electrochemical battery system of claim 12, wherein the weighted factors include a SOC of the second electrochemical cell.

14. The electrochemical battery system of claim 12, wherein the weighted factors include the amount by which the first electrochemical cell SOC exceeds the SOC threshold.

15. The electrochemical battery system of claim 12, wherein the weighted factors include whether or not the first electrochemical cell SOC exceeds the SOC threshold.

16. The electrochemical battery system of claim 12, wherein the weighted factors include an amount of charging current available.

* * * * *